UNITED STATES PATENT OFFICE.

JOSEPH RICHARDS, OF PHILADELPHIA, PENNSYLVANIA.

IMPROVEMENT IN THE MODE OF SMELTING IRON ORES.

Specification forming part of Letters Patent No. 1,032, dated December 10, 1838.

*To all whom it may concern:*

Be it known that I, JOSEPH RICHARDS, of Philadelphia, in the State of Pennsylvania, white-lead manufacturer, have discovered or invented a new and useful Improvement in the Mode of Smelting Iron Ores and in the Mode of Manufacturing Steel, which improvement consists in the use of pyroligneous or acetic acids in a gaseous state; and I do hereby declare that the following is a full and exact description of preparing or using the said improvement.

In smelting iron ores the object is to produce a carbonate of iron. The process hitherto known as best adapted to this end is by using charcoal for the fuel and limestone as the flux. The substitution of coke as a fuel, or any of the mineral coals, does not produce iron so highly carbonated as that which is smelted by the use of charcoal.

My improvement consists in the use of one or more iron cylinders or other vessels conveniently placed and similar to the apparatus in common use for producing pyroligneous acid and capable of containing compactly a half a cord of wood or any other desired quantity, (dry wood evolves more acid than green, and white oak is the best.) Vinegar or acetic acids may be used instead of wood, and the cylinder or vessel may be adapted to these substances. The cylinder or vessel containing the wood or acids must be tightly closed and furnished with a pipe that will conduct the gas evolved into the furnace above the blast. The cylinder or vessel must then be heated to a temperature that will disengage the gas and drive it into the furnace. The gas from half a cord of dry white oak will continue to evolve for twenty-four hours. The use of clay, as commonly practiced, will hinder the gas from escaping out of the furnace, and it will be rapidly absorbed by the metal in fusion and cause it to have an increased affinity for the carbon evolved from the fuel and limestone, and the iron will be thus furnished with a full charge of carbon.

In converting iron into steel the present process is by the slow operation of the carbon which is disengaged from the charcoal and is absorbed by the metal bars. My improvement consists in the direct use, application, or introduction of pyroligneous or acetic acid in a gaseous state into the steel-furnace in manner aforesaid, which will cause the iron to have an increased affinity for the carbon evolved from the fuel, and will thus become more rapidly charged with the carbon. My improvement will be found to be most useful when coke, mineral coal, or fuel other than charcoal is used in the steel-furnaces.

What I claim as my invention or discovery, and desire to secure by Letters Patent, is—

The direct use, application, or introduction of pyroligneous or acetic acids in a gaseous state into the process of smelting iron ores, and in the manufacturing of steel.

JOSEPH RICHARDS.

Witnesses:
JOSEPH BURDEN,
JOSEPH LYON.